United States Patent [19]

Launes

[11] Patent Number: 4,709,960
[45] Date of Patent: Dec. 1, 1987

[54] RECLINABLE CHILDREN'S CHAIR
[75] Inventor: Joaquín J. Launes, Barcelona, Spain
[73] Assignee: Play, S. A., Spain
[21] Appl. No.: 852,993
[22] Filed: Apr. 17, 1986
[30] Foreign Application Priority Data
  Apr. 24, 1985 [ES] Spain .................................. 286732
  Jun. 12, 1985 [ES] Spain .................................. 287.400
[51] Int. Cl.⁴ ............................................. A47D 1/10
[52] U.S. Cl. .................................. 297/250; 297/329; 297/330
[58] Field of Search .............. 297/329, 322, 330, 250, 297/320; 248/393, 394, 395

[56] References Cited
U.S. PATENT DOCUMENTS

| 488,773 | 12/1892 | Peck | 297/322 |
| 3,232,575 | 2/1966 | Ferro | 297/329 X |
| 3,641,995 | 2/1972 | Braudt | 297/330 X |
| 3,861,743 | 1/1975 | Dauton | 297/329 |
| 4,205,877 | 6/1980 | Ettridge | 297/322 X |
| 4,348,048 | 9/1982 | Thevenot | 297/250 |
| 4,545,617 | 10/1985 | Drexler et al. | 297/320 |

FOREIGN PATENT DOCUMENTS

| 889640 | 1/1944 | France | 297/329 |
| 1151003 | 1/1958 | France | 297/329 |
| 585196 | 1/1947 | United Kingdom | 248/393 |

Primary Examiner—Francis K. Zugel
Attorney, Agent, or Firm—McGlew and Tuttle

[57] ABSTRACT

A reclinable children's chair or child's chair for use on a motor vehicle seat, comprising a base frame to be placed on such vehicle seat, and a reclinable child's seat operatively engaged with the base frame and movable generally longitudinally back and forth relative to the base frame selectively angularly between an upright rearward position and a reclined forward position, a drive mechanism, e.g. a motor and drive shaft and connecting rod linkage, mounted on the base frame and operatively connected to the reclinable seat for so moving the reclinable seat, and a control mechanism for controlling the operation of the drive mechanism e.g. a manual handle for rotating the shaft and/or a switch for operating the motor.

8 Claims, 4 Drawing Figures

RECLINABLE CHILDREN'S CHAIR

FIELD AND BACKGROUND OF THE INVENTION

The present invention relates to a reclinable children's chair or child's chair. This children's chair is mainly designed to be fitted at the rear seat of a motor vehicle.

This type of chair generally comprises a basic frame which is portably fitted to the vehicle by suitable belt devices and a seat engaged to said basic frame where the child is secured by a suitable harness. This seat in most cases is all, i.e. entirely, reclinable at several positions, or only the backrest of the seat is so reclinable. These chairs accordingly show manually operated motions by means of which the seat change of position is achieved. These change of position movements are however troublesome and in some cases the child must even be drawn back or removed so as to decrease significantly any force that might be required to achieve these movements.

Reclinable children's chairs of the conventional type specifically include those of Spanish Utility Models Nos. 247,966; 257,311 and 286,377, which are referred to more fully hereinbelow.

SUMMARY OF THE INVENTION

In the chair according to the present invention, the above noted trouble has been remedied, since the seat change of position is automatically made, i.e. without the need for exerting any amount of force by the individual in charge, with the additional advantage that many more intermediate positions are obtained. In contrast thereto, the generally known chairs are reclinable only in two positions and in a few cases at best only in one more position.

These advantages are obtained according to the present invention by operation of the seat tilting movement system by means of a motor, advantageously of the electrical type, which is operated by a control causing it to be rotated in any given way to achieve a forward or backward reclination of the seat at the desired angle; this motor can be powered by a battery located at the chair itself or by connection to the vehicle's own battery.

The seat tilting movement is attained by a motion system representing a remarkable improvement over those seen in the children's seats of the Spanish Utility Models Nos. 247,966 and 257,311, the first of which shows a basic angularly telescopic frame where the corresponding angular frame of the seat is also pivotedly positioned, the second Utility Model showing a frame of a similar construction and comprising a footrest. These utility models comprise a motion system of pivoted arms and connecting rods determining by a specific control the two end positions in the seat's reclination.

In the seat according to the present invention, the frame structure has remarkably been improved both in the base and in the same seat's support proper, and also in the mechanical means to achieve the seat change of position.

In accordance with the present invention, the seat interlocking frame shows a simplified vertically arcuate construction, being slidably guided by a basic frame or a frame interlocked system of bearing-supports, and having independently fitted at said basic frame a transverse control shaft associated with or at the intermediate area of said arcuate frame by means of connecting rods, two opposing stops for limiting the opposite end positions of the seat's reclination being provided between said shaft and said frame.

Said control transverse shaft is also provided so as to be operated manually by a handle in addition to being electrically driven.

So that the understanding of the present invention may be made clearer, the accompanying drawings are provided wherein are shown two practical embodiments but only cited by way of non-exhaustive comparison examples to illustrate the scope of the present invention.

DESCRIPTION OF THE PREFERRED EMBODIMENTS

Figure 1:
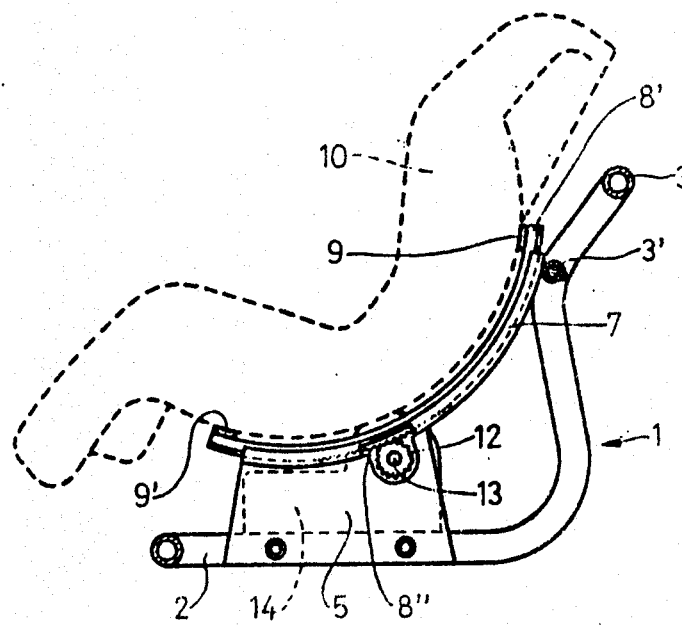
FIG. 1 shows in a side elevation view a conventional children's chair fitted with means to be electrically driven.
Figure 2:
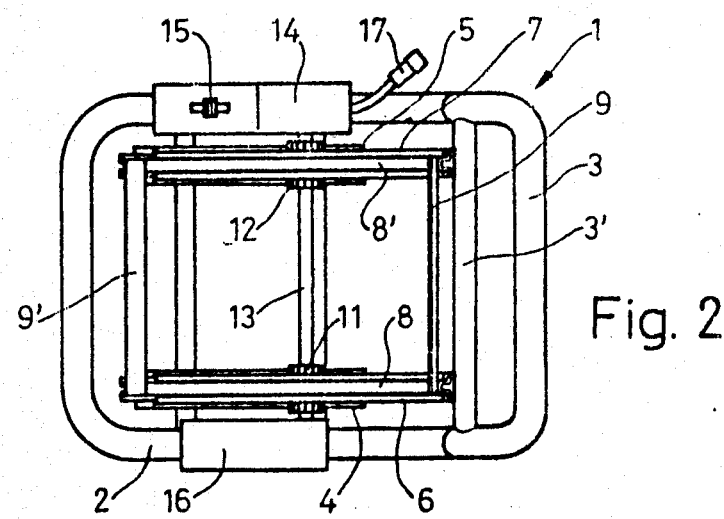
FIG. 2 shows a plan view of the frame of said chair of FIG. 1 fitted with a motor and a battery.

Referring to the drawings, the chair of FIGS. 1 and 2 comprises a frame 1 shaped up or formed by a metal tube making up a horizontally U-shaped base 2 being backwardly inflectioned or bended upwardly and topped off or upwardly terminating in a transverse length 3. Two blocks 4 and 5 of arcuate upper edge are laterally fitted to said base and on the blocks are secured respectively arched guides 6 and 7 backwardly linked to a frame cross-member 3', and in these guides play the profiles 8 and 8' making up the frame of the seat 10 formed by a molded single component, these profiles showing the same curvature as those guides, and the frame is completed with the respective rear and front cross-members 9 and 9'.

Said profiles show a portion of their lower edge as toothed to form a rack 8" wherein respective pinions 11 and 12 are engaged, the pinions being interlocked to a transverse shaft 13 rotatingly driven by a reducer motor 14 provided with a three-position switching control 15 comprising a motor stopping station and two others correspondingly for achieving opposite end positions by motor rotation in one or ther other direction.

This electrical motor is driven by a suitable battery 16 mounted in the same frame 1 as the electrical motor.

Said motor however can be driven if required by the vehicle's own battery using the appropriate fitted connector 17 which by a lead wire can be connected to or powered by the socket of the electrical lighter in the same vehicle.

The control of the motor 14 can also for example be attained with a pedal or a remote control.

Also it is foreseen that the motor need not be electrical, for example instead being driven by a rope mechanism, and the pinions 11 and 12 and the racks 8" can be replaced by an lever and cable system or other arrangements operated by the shaft driven by the reducer motor.

In the case shown a similar frame to that comprising the children's chair which is the object of the Spanish Utility Model No. 286,337 has been used; however this frame can be any other convenient one.

Figure 3:
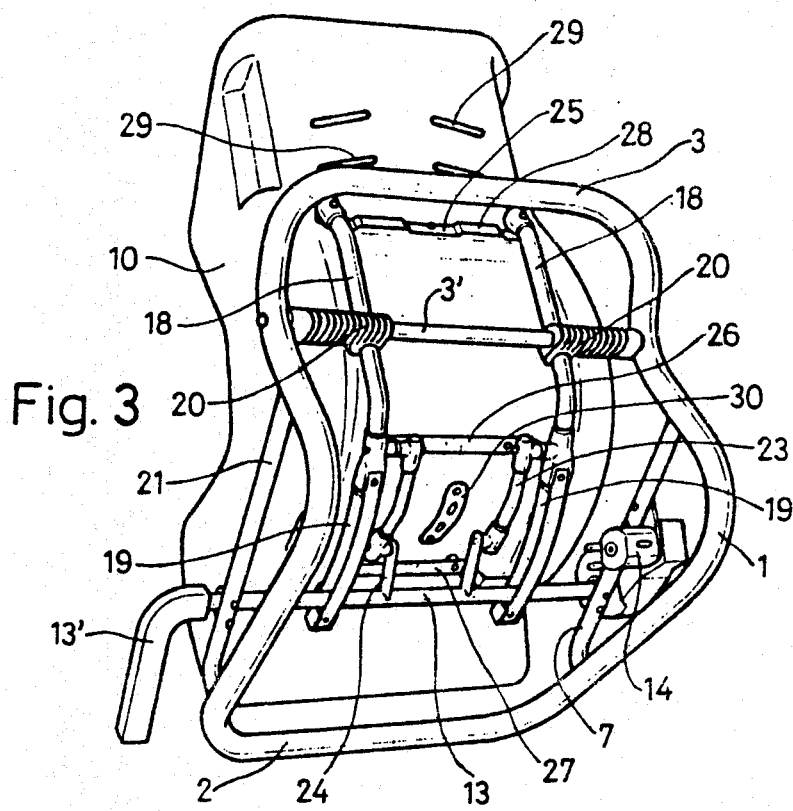
FIG. 3 shows in an underside perspective view the assembly of the children's seat, according to the present invention, in a more vertical or upright rearward position.
Figure 4:
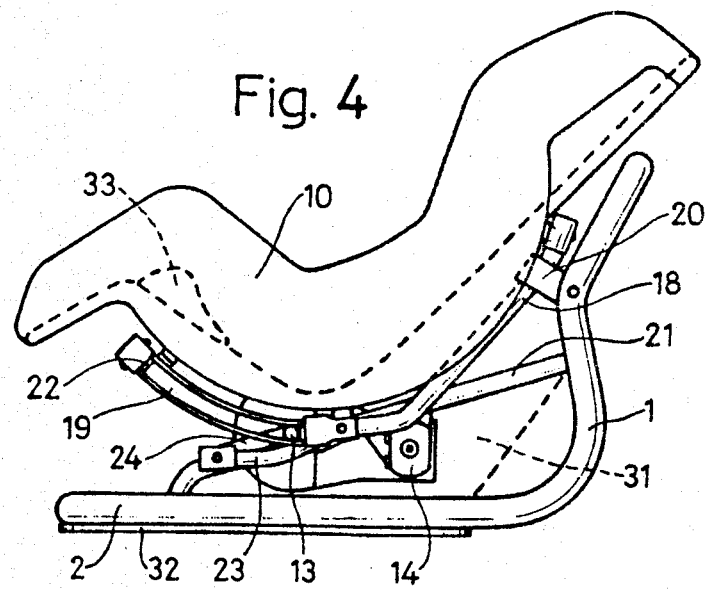
FIG. 4 shows said seat of FIG. 3 in a side elevation view with a cross-sectioned control shaft and in a more reclined or angular forward position.

In the chair of FIGS. 3 and 4 per the present invention, the seat 10 is fitted to an arcuate frame shaped up by two arcuate members 18 provided at the corresponding lower half with a slit or slot 19. This frame is slidably engaged to the basic frame 1.

This frame shows at its corresponding upper or raised sides respective bearing supports 20 wherein are inserted and guided the arcuate members 18 at their upper half portions, while at the lower half portions said members run along through their corresponding slit 19 thereat which is guided by the control transverse shaft 13 which in turn is rotatingly mounted at its ends correspondingly by an obliquely positioned longitudinal member 21 laterally interlocked to the basic frame.

The limiting of the generally angular or inclined vertical and/or longitudinal back and forth movement or sliding of the frame 18 and the seat 10 as between two opposing stop positions relative to the basic frame for selective angular positioning thereof is obtained by collision or abutment of the opposing forward and rearward ends of the corresponding generally longitudinally extending slot or slit 19 against said shaft 13; there being provided at the opposing forward and rearward ends of the corresponding said slit some flexible end stops 22 to dampen said collision.

Upward and backward, and downward and forward, seat displacements are correspondingly achieved by a motion system linkage of connecting rods 23 pivoted at one corresponding end to the intermediate area of the frame 18 and at the other end to the respective crank arms 24 radially interlocked to shaft 13, so that when said shaft is rotated in one or the other direction by a crank handle 13', the arms 24 are rotated and the connecting rods 23 are downwardly or upwardly driven thereby, said connecting rods 23 passing down or transmitting this movement to the frame.

The shaft 13 can also be driven at its other end by an electrical motor 14 by means of a reducer, i.e. as earlier described.

The engagement of the frame 18 to the seat 10 is reinforced by three cross-members 25, 26 and 27, the frist of which forms a double bridge 28 for fitting the insertion braces into the seat's slits 29 which are associated with the safety belting harness which locks the child to the seat, the belt of which harness passes over the outside of the seat and is inserted into the belt strap 30 clamped at the seat underside. Should the safety belting braces be self-adjustable by a retractable arrangement, these braces can then, instead of being positioned at said bridge 28, be located at the retractable arrangement which can for example be placed under the seat.

With reference number 31 is shown a plate of a faired side engageable to the frame 1, with reference number 32 is shown a plate of plastic material engaged at the lower side of said frame for protection of the vehicle seat upholstery onto which the chair is to be portably or removably positioned, and with referfence number 33 is shown a convex component detachably engageable at the center of the seat's front edge to prevent the child from downwardly sliding therefrom. It will be recognized that the seat might show many more other accessories both functional and finished as for example the arrangement of a stuffed or cushioned upholstery on the seat and in a detachable assembly.

This seat might also be slided in other types of supports and guides different from those above illustrated and described.

The invention within its essentiality can practically be carried out in other embodiments only differing in detail from the above, shown only by way of example, and to which other ways the scope of protection sought is also to be extended. This reclinable children's seat can thus be manufactured in any shape and size, with the most suitable means and materials and most convenient accessories, and such is contemplated by the scope of the following claims.

I claim:
1. Reclinable children's chair for use as a portable chair on a vehicle seat in a motor vehicle, comprising
    a base frame adapted to be placed on such a vehicle seat, and a reclinable child's seat operatively slidably and guidably engaged with and supported by the base frame and movable generally longitudinally back and forth relative to the base frame selectively angularly between an upright rearward position and a reclined forward position,
    guide frame supports interlocked to the base frame, and a generally vertically arcuate guide frame attached to the reclinable seat for movement therewith and guidably engaged with and supported by the guide frame supports,
    a rotatable transverse drive shaft mounted on the base frame and a connecting rod linkage operatively connecting the shaft to the reclinable seat for so moving the reclinable seat upon corresponding rotation of the shaft and including radial crank arm means on the shaft and connecting rod means correspondingly operatively connected at one end to the arm means and at the other end to an intermediate portion of the guide frame for transmitting rotational motion of the shaft as longitudinal motion to the reclinable seat,
    limit means for limiting the movement of the reclinable seat between two opposing operative end positions corresponding to the upright and reclined positions of the reclinable seat and including generally longitudinal slot means in the guide frame provided with opposing forward and rearward slot end stop means, the shaft being arranged in the slot means for independently guidably engaging and supporting the guide frame thereat,
    such that upon reclinable seat rearward movement to the upright rearward position, the forward slot end stop means will abut the shaft to limit further rearward seat movement, and in turn upon reclinable seat forward movement to the reclined forward position, the rearward slot end stop means will abut the shaft to limit further forward seat movement, and further
    such that the guide frame supports and shaft on the base frame correspondingly guidably engage and support the guide frame and slot means in any position of movement of the reclinable seat, and means for rotating the shaft.
2. Chair of claim 1 wherein the means for rotating the shaft includes a manual handle operatively connected to the shaft for manually rotating the shaft.
3. Chair of claim 1 wherein the means for rotating the shaft includes an electric reducer motor operatively connected to the shaft for rotating the shaft, and provided with switch means for operating the motor in opposite rotational directions respectively.

4. Chair of claim 3 wherein the means for rotating the shaft includes a manual handle operatively connected to the shaft for manually rotating the shaft as an alternative to the operation of the motor.

5. Reclinable children's chair for use as a portable chair on a vehicle seat in a motor vehicle, comprising
   a base frame adapted to be placed on such a vehicle seat, and a reclinable child's seat operatively slidably and guidably engaged with and supported by the base frame and movable generally longitudinally back and forth relative to the base frame selectively angularly between an upright rearward position and a reclined forward position,
   guide frame supports interlocked to the base frame, and a generally vertically arcuate guide frame attached to the reclinable seat for movement therewith and guidably engaged with and supported by the guide frame supports,
   a rotatable transverse drive shaft mounted on the base frame and a connecting rod linkage operatively connecting the shaft to the reclinable seat for so moving the reclinable seat upon corresponding rotation of the shaft and including radial crank arm means on the shaft and connecting rod means correspondingly operatively connected at one end to the arm means and at the other end to an intermediate portion of the guide frame for transmitting rotational motion of the shaft as longitudinal motion to the reclinable seat,
   limit means for limiting the movement of the reclinable seat between two opposing operative end positions corresponding to the upright and reclined positions of the reclinable seat and including generally longitudinal slot means in the guide frame provided with opposing forward and rearward slot end stop means, the shaft being arranged in the slot means for independently guidably engaging and supporting the guide frame thereat,
   such that upon reclinable set rearward movement to the upright rearward position, the forward slot end stop means will abut the shaft to limit further rearward seat movement, and in turn upon reclinable seat forward movement to the reclined forward position, the rearward slot end stop means will abut the shaft to limit further forward seat movement, and further
   such that the guide frame supports and shaft on the base frame correspondingly guidably engage and support the guide frame and slot means in any position of movement of the reclinable seat, and
   means including a motor operatively connected for rotating the shaft.

6. Chair of claim 5 wherein the motor is an electric motor powered by a self-contained energy source provided on the base frame.

7. Chair of claim 5 wherein the motor is an electric motor provided with a power connection means for connection to a battery of such a vehicle for powering the motor.

8. Chair of claim 5 wherein the means for rotating the shaft further includes a manual handle operatively connected to the shaft for manually rotating the shaft as an alternative to the rotation by the motor.

* * * * *